(12) United States Patent
Mammadov et al.

(10) Patent No.: US 8,551,434 B1
(45) Date of Patent: Oct. 8, 2013

(54) METHOD OF FORMING A SYNGAS MIXTURE

(75) Inventors: Aghaddin Mammadov, Houston, TX (US); Mike Huckman, Houston, TX (US); Clark Rea, Houston, TX (US); Xiankuan Zhang, Houston, TX (US); Shahid N. Shaikh, Houston, TX (US)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 13/537,302

(22) Filed: Jun. 29, 2012

(51) Int. Cl.
*B01D 53/14* (2006.01)

(52) U.S. Cl.
USPC ........................ 423/220; 423/418.2

(58) Field of Classification Search
USPC ............................. 423/418.2, 220
See application file for complete search history.

(56) References Cited

U.S. PATENT DOCUMENTS

| | | | |
|---|---|---|---|
| 1,913,364 A | 6/1933 | Bader et al. | |
| 3,479,149 A | 11/1969 | Frilette | |
| 4,216,194 A * | 8/1980 | Regier | 423/459 |
| 5,346,679 A | 9/1994 | Osaki et al. | |
| 5,385,949 A | 1/1995 | Tierney et al. | |
| 5,496,530 A | 3/1996 | Vannby et al. | |
| 6,328,945 B1 | 12/2001 | Hufton et al. | |
| 6,833,013 B1 | 12/2004 | Sanfilippo et al. | |
| 7,179,442 B2 | 2/2007 | Hagemeyer | |
| 2003/0068269 A1 | 4/2003 | Matzakos et al. | |
| 2003/0113244 A1 | 6/2003 | Dupont et al. | |
| 2010/0105962 A1 | 4/2010 | Mamedov et al. | |
| 2010/0190874 A1 * | 7/2010 | Mamedov et al. | 518/702 |

FOREIGN PATENT DOCUMENTS

| | | |
|---|---|---|
| EP | 1445235 A2 | 8/2004 |
| GB | 2168718 A | 11/1984 |
| GB | 2279583 A | 1/1995 |
| GB | 2279583 A | 1/1995 |
| WO | WO96/06064 A1 | 2/1996 |
| WO | WO2005/026093 A1 | 3/2005 |
| WO | WO2011/056715 A1 | 5/2011 |

OTHER PUBLICATIONS

Piotr Michorczyk et al., Simultaneous Propane Dehydrogenation and CO2 Hydrogenation Over CrOx/SiO2 Catalyst, Reaction Kinetics and Catalysis Letters, Dec. 1, 2005, pp. 177-183, vol. 87, No. 1, Institute of Organic Chemistry and Technology, Cracow University of Technology, Krakow, Poland.
Chen-Shium Chen et al., Study of Iron-Promoted Cu/SiO2 Catalyst on High Temperature Reverse Water Gas Shift Reaction, Applied Catalysis A: General, Jan. 10, 2004, pp. 97-106, vol. 257, No. 1, Elsevier Science, Amsterdam, NL.
International Search Report for PCT/US2012/069161, Feb. 18, 2013, pp. 1-5, International Searching Authority.
Written Opinion of the International Searching Authority for PCT/US2012/069161, Feb. 18, 2013, pp. 1-7.

* cited by examiner

*Primary Examiner* — Stanley Silverman
*Assistant Examiner* — Richard M Rump
(74) *Attorney, Agent, or Firm* — Grady K. Bergen; Gino C. Catena; Griggs Bergen LLP

(57) ABSTRACT

A method for making a syngas mixture is accomplished by introducing a gaseous feed mixture containing carbon dioxide and hydrogen into a reactor containing a non-zinc catalyst. The catalyst contacts the gaseous feed mixture to form syngas mixture reaction products. The reaction takes place in the presence of nickel-containing and/or iron-containing materials. The gaseous feed mixture is introduced into the reactor at a reactor inlet temperature of from 700° C. to 800° C., with the reaction being carried out at substantially adiabatic conditions or wherein the syngas mixture reaction products are removed from the reactor at a reactor outlet temperature of from 500° C. to 600° C.

20 Claims, No Drawings

METHOD OF FORMING A SYNGAS MIXTURE

TECHNICAL FIELD

Embodiments of the present invention relate to the catalytic processes for producing a synthesis gas (syngas) mixture from carbon dioxide and hydrogen.

BACKGROUND

U.S. Pat. App. Pub. No. 2003/0113244A1 discloses a process for the production of a synthesis gas (syngas) mixture that is rich in carbon monoxide (CO), by converting a gas phase mixture of $CO_2$ and $H_2$ in the temperature range 500-600° C. in the presence of a catalyst based on zinc oxide and chromium oxide, but not including iron. The presence of both Zn and Cr was indicated to be essential for formation of carbon monoxide and hydrogen mixture at a good reaction rate, whereas the presence of Fe and/or Ni was to be avoided to suppress formation of methane via so-called methanation side-reactions. Formation of methane as a by-product is generally not desired, because its production reduces CO production. The co-production of methane may also reduce catalyst life-time by coke formation and deposition thereof.

In the past decades, numerous processes have been developed to produce syngas, which is one of the most important feedstocks in the chemical industry. Natural gas and (light) hydrocarbons are the predominant starting material for making syngas. Syngas is successfully used as synthetic fuel and also in a number of chemical processes, such as synthesis of methanol, ammonia, Fischer-Tropsch type synthesis and other olefin syntheses, hydroformylation or carbonylation reactions, reduction of iron oxides in steel production, etc.

Such syngas processes frequently use methane as the dominate feedstock, which may be converted to syngas by steam reforming, partial oxidation, $CO_2$ reforming, or by a so-called auto-thermal reforming reaction. One of the disadvantages associated with syngas production by steam reforming of methane, which is the most widely applied process to produce syngas, is that the composition of the produced gas mixture is limited by the reaction stoichiometry to $H_2/CO$ ratios of 3 or higher.

In order to avoid such drawbacks and to help counteract increasing carbon dioxide ($CO_2$) concentrations in the atmosphere, research has been conducted to manufacture syngas from $CO_2$ as a raw material. The conversion is based on an equilibrium reaction shown in Equation 1 below:

$$CO+H_2O \leftrightharpoons CO_2+H_2 \quad (1)$$

The forward reaction is known as the water gas shift (WGS) reaction, while the reverse reaction is known as the reverse water gas shift (RWGS) reaction.

Conversion of $CO_2$ to CO by a catalytic RWGS reaction has been recognized as a promising process for $CO_2$ utilization, and has been the subject of various studies in the past decades. Early work proposed iron oxide/chromium oxide (chromite) catalysts for this endothermic reaction; see, e.g., U.S. Pat. No. 1,913,364. Disadvantages of these catalysts included methane formation and the accompanying catalyst coking problem.

GB2168718A discloses combining the RWGS reaction with steam reforming of methane. The combination of the two reactions allows the molar ratio of hydrogen to carbon monoxide ($H_2/CO$) to be adjusted and to better control the stoichiometric number (SN) given by $([H_2]-[CO_2])/([CO]+[CO_2])$ in the final syngas mixture to values other than about 3 or higher, depending on the intended subsequent use of the syngas mixture.

GB2279583A discloses a catalyst for the reduction of carbon dioxide, which comprises at least one transition metal selected from Group VIII metals and Group VIa metals supported on ZnO alone, or on a composite support material containing ZnO. In order to suppress methane formation and catalyst deactivation, stoichiometric hydrogen/carbon dioxide mixtures and low reaction temperatures were used, which resulted in relatively low carbon dioxide conversion.

U.S. Pat. No. 5,346,679 discloses the reduction of carbon dioxide into carbon monoxide with hydrogen using a catalyst based on tungsten sulfide.

U.S. Pat. No. 3,479,149 discloses using crystalline aluminosilicates as catalyst in the conversion of carbon monoxide and water to carbon dioxide and hydrogen, and vice versa.

In WO1996/06064A1 a process for methanol production is described, which comprises a step of converting part of the carbon dioxide contained in a feed mixture with hydrogen to carbon monoxide, in the presence of a WGS catalyst exemplified by Zn—Cr/alumina and $MoO_3$/alumina catalysts.

WO2005/026093A1 discloses a process for producing dimethylether (DME), which comprises a step of reacting carbon dioxide with hydrogen in a RWGS reactor to provide carbon monoxide, in the presence of a ZnO supported catalyst; a $MnO_x$ (x=1~2) supported catalyst; an alkaline earth metal oxide supported catalyst and a NiO supported catalyst.

EP1445232A2 discloses a RWGS reaction for production of carbon monoxide by hydrogenation of carbon dioxide at temperatures of about 560° C. in the presence of a Mn—Zr oxide catalyst. A drawback of this process for syngas production as disclosed above is the selectivity of the catalyst employed; that is methane formation from carbon dioxide is still observed as a side-reaction. In the illustrative example, this methane formation was quantified as 0.8 vol % of methane being formed in the gas output of the reactor, at a degree of conversion of carbon dioxide of 40%.

GB2168718A and U.S. Pat. No. 6,328,945B1 also disclose processes that combine methane reforming and RWGS steps, but these publications do not describe or suggest the use of a catalyst as defined in the present invention.

While numerous catalysts and processes have been developed for the production of syngas from hydrogen and carbon dioxide, there is still a need in the art for new, distinct and often improved catalysts and processes for the production of usable syngas mixtures from carbon dioxide and hydrogen, where the catalysts and processes result in relatively high carbon dioxide conversions with minimal or no production of alkane (e.g. methane) byproducts and where the catalysts are stable and slow to deactivate even after extended on-stream times.

SUMMARY OF THE INVENTION

A method for making a syngas mixture is carried out by introducing a gaseous feed mixture containing carbon dioxide and hydrogen into a reactor containing a non-zinc catalyst that contacts the gaseous feed mixture to form syngas mixture reaction products. The reaction may take place in the presence of nickel-containing and/or iron-containing materials. The gaseous feed mixture is introduced into the reactor at a reactor inlet temperature of from 700° C. to 800° C., with the reaction being carried out at substantially adiabatic conditions.

In certain embodiments, the catalyst is an oxide of at least one of chromium (Cr) and copper-manganese (Cu—Mn).

The reactor may have a reactor outlet temperature of from 500° C. to 600° C. in particular applications. In other applications, the reactor may have a reactor outlet temperature of from 550° C. to 570° C. The reactor may also have an inlet temperature of from 720° C. to 780° C. in certain embodiments.

The reaction products may include carbon monoxide and the carbon monoxide may be present in the reaction products in an amount of from 10% to 20% by weight calculated after water removal from the reaction products. In some applications, the reaction products may include carbon monoxide and hydrogen in a molar ratio of from 0.1 to 3.

The reaction may be carried out at a pressure of from 0.1 MPa and 6 MPa and a reactor residence time of from 0.5 sec to 10 sec.

The reactor components may be stainless steel. The reactor components may be formed of nickel-containing and/or iron-containing materials, wherein the reactor components are non-coated so that the nickel-containing and/or iron-containing materials are exposed.

In certain applications, the feed gas mixture may contain hydrogen and carbon dioxide in a molar ratio of from 1 to 5, respectively.

In another method for making a syngas mixture, the method is carried out by introducing a gaseous feed mixture containing carbon dioxide and hydrogen into a reactor containing a non-zinc catalyst that contacts the gaseous feed mixture in the presence of reactor components of nickel-containing and/or iron-containing materials to form syngas mixture reaction products that include carbon monoxide. The gaseous feed mixture is introduced into the reactor at a reactor inlet temperature of from 700° C. to 800° C. The syngas mixture reaction products are removed from the reactor at a reactor outlet temperature of from 500° C. to 600° C.

In certain applications the reactor inlet temperature may be from 720° C. to 780° C. The reactor may also have a reactor outlet temperature of from 550° C. to 570° C.

In certain embodiments, the catalyst is an oxide of at least one of chromium (Cr) and copper-manganese (Cu—Mn).

The carbon monoxide may be present in the reaction products in an amount of from 10% to 20% by weight calculated after water removal from the reaction products. In some applications, the reaction products may include carbon monoxide and hydrogen in a molar ratio of from 0.1 to 3.

The reaction may be carried out at a pressure of from 0.1 MPa and 6 MPa and a reactor residence time of from 0.5 sec to 10 sec.

The reactor components may be stainless steel. The reactor components may be formed of nickel-containing and/or iron-containing materials, the reactor components being non-coated so that the nickel-containing and/or iron-containing materials are exposed.

In certain applications, the feed gas mixture may contain hydrogen and carbon dioxide in a molar ratio of from 1 to 5, respectively.

DETAILED DESCRIPTION OF THE INVENTION

In the processes according to the present invention, carbon dioxide is selectively converted into carbon monoxide by a reverse water gas shift (RWGS) reaction in the presence of a non-zinc redox catalyst under certain reaction conditions. The resulting product of this $CO_2$ hydrogenation process is a gas mixture containing carbon monoxide and water, and non-converted carbon dioxide and hydrogen. The RWGS reaction, in the case of excess hydrogen, can be represented by the following Equation 2 below:

$$CO_2 + nH_2 \leftrightarrows CO + (n-1)H_2 + H_2O \quad (2)$$

In carrying out the RWGS reaction, it should be understood that both nickel (Ni) and iron (Fe) have high catalytic activity for methanation reactions. In the presence of such materials, the following additional methanation reactions in Equations 3 and 4 below may take place:

$$2CO + Fe \text{ and/or } Ni \leftrightarrows CO_2 + C\text{—Fe and/or } C\text{—Ni} \quad (3)$$

$$C\text{—Fe and/or } C\text{—Ni} + 2H_2 \rightarrow CH_4 + Fe \text{ and/or } Ni \quad (4)$$

The formation of methane ($CH_4$) or other alkanes byproducts is undesirable. Not only does methane production compete with and reduce the amount of syngas produced, the formation of such byproducts also correlates to coke formation. Coke and coke fragments can coat and foul both the catalysts and reactor components, shortening catalyst life and damaging reactor components.

As a result of this, reactors containing nickel and/or iron may be avoided in the production of syngas. On a lab scale, this may not be a problem as smaller non-metal reactors or reactors free from such materials, such as quartz reactors, may be used. In commercial production, however, where reactor design is on a much larger scale, most reactors are formed from steel or stainless steel, which can contain large quantities of iron and nickel. Even when such metal reactor vessel walls or reactor components are coated or lined (e.g. glass, silica, etc.) to facilitate prevention of contact of the reactants from exposed iron or nickel, methane and coke production may still occur.

The production of methane and coke is also temperature dependent. At mild temperatures, such as 400-600° C., the product CO in Equation 2 undergoes further decomposition in the presence of iron or nickel with the formation of methane (Equations 3 and 4) through exothermic reactions. At higher temperatures or temperatures of from 700° C. to 780° C., 790° C., 800° C. or higher, however, the reaction of Equation 3 above is reversed back to the formation of CO. This facilitates eliminating the formation of coke and coke fragments that result from the formation of methane according to Equation 4.

It should be understood that with respect to any concentration or amount range listed or described in the summary and detailed description as being useful, suitable, or the like, it is intended to include every concentration or amount within the range, including the end points, and is to be considered as having been specifically stated. For example, "a range of from 1 to 10" is to be read as indicating each and every possible number along the continuum between about 1 and about 10. Thus, even if specific data points within the range, or even no data points within the range, are explicitly identified or refer to only a specific few, it is to be understood that the inventors appreciate and understand that any and all data points within the range are to be considered to have been specified, and that the inventors are in possession of the entire range and all points within the range.

Conventional syngas catalysts, in particular zinc oxide catalysts (e.g. Cu—Zn oxide), however, cannot operate at such higher temperatures that result in the reversal of the reaction back to CO due to the instability of zinc at such high temperatures. Catalysts that may be used at higher temperatures that do reverse the reaction of Equation 3 so that the formation of methane, and thus coke, is reduced or eliminated, have been described in U.S. Pat. App. Pub. No. 2010/0190874A1 and U.S. Pat. App. Pub. No. 2010/0105962, which are each incorporated herein by reference for all purposes.

In some embodiments of the present invention, a process for the catalytic hydrogenation of $CO_2$ to syngas is conducted in the presence of a non-zinc catalyst, which facilitates the RWGS reaction. In some embodiments, the catalyst may be an oxide of metals with redox properties. In particular applications, the catalyst may be an oxide of chromium and/or copper-manganese. Examples of suitable chromium catalysts may be $Cr_2O_3$, $Cr/Al_2O_3$, $Cr/SiO_2$, $Cr/MgO$, etc., which may include chromium provided on a support, such as alumina ($Al_2O_3$) that forms a chromium-oxide-aluminum complex. An example of a suitable commercially available $Cr/Al_2O_3$ catalyst is that marketed as CATOFIN® catalyst, from Süd-Chemie AG, Munich, Germany, which has been used for dehydrogenation processes, such as dehydrogenation of isobutane. Other example of suitable catalysts having the desired redox properties are those based on a mixture of copper and manganese oxides. Such copper and manganese catalyst may be those provided on an alumina support (Cu—Mn/$Al_2O_3$). Both chromium and copper-manganese catalysts have been shown to be useful at both low reaction temperatures (e.g. 560° C.) and high reaction temperatures above 700° C. in RWGS reactions.

The activities of different catalysts for the RWGS reaction may be different. Therefore different amounts of catalysts may be used in the reactions in various embodiments. In the case of $Cr/Al_2O_3$ catalyst, for instance, 60% of $CO_2$ conversion was observed at a gas hourly space velocity (GHSV) of 400-600 $h^{-1}$, while the same level of $CO_2$ conversion on a Cu—Mn/$Al_2O_3$ catalyst was observed at GHSV of 3600-5000 $h^{-1}$. A test of the catalyst activity for the catalysts used may be performed with a known loading of a catalyst sample with a variation of the flow rate to determine a suitable space velocity for carrying out the reactions.

The above-described catalysts are used in a fixed catalyst bed of a reactor in a RWGS reaction in the presence of nickel and/or iron containing materials. The nickel and iron containing materials may include portions of the reactor vessel, such as the reactor vessel walls, or components of the reactor such as supports, trays, fittings, etc., which may come into contact with the reactants introduced into the reactor. Such materials may be in the form of steel or stainless steel. One advantage of the present invention is that the reactor components may be non-coated nickel-containing and/or iron-containing materials so that the nickel-containing and/or iron-containing materials are directly exposed. In this way, the need for specialized reactor materials is obviated, resulting in cost advantages. In certain instances, the presence of nickel and iron may be due to exposed nickel and iron in coated, lined or protected reactor components wherein such coatings, linings, etc. have either worn off or otherwise were not sufficient to prevent exposure of the nickel and iron materials to the reactants during the reaction.

In some embodiments of the invention, a gaseous feed mixture containing carbon dioxide and hydrogen gas is introduced into the reactor (or reactors) containing the non-zinc redox catalyst at a reactor inlet temperature of from 700° C., 710° C., or 720° C. to 740° C., 750° C., 760° C., 770° C., 780° C., 790° C., or 800° C. to form syngas mixture reaction products. A preheater or heat exchanger may be used in some embodiments, if necessary, to facilitate bringing the gaseous feed mixture to the selected reactor inlet temperature. In various embodiments, the syngas feed mixture may be introduced into the reactor at a temperature of from 710° C. to 790° C., more particularly from 720° C. to 740° C., 750° C., 760° C., 770° C., or 780° C.

The syngas mixture reaction products will include carbon dioxide, as well as hydrogen gas and water, according to Equation 2 above. Because the reaction is carried out substantially adiabatically or with no added heat being input into the reaction, the syngas mixture reaction products are removed from the reactor at a reduced temperature. In particular, in some embodiments, the reactor may have a reactor outlet temperature of the syngas mixture products of from 400° C. to 600° C. In certain embodiments, the reactor may have a reactor outlet temperature of from 500° C. to 600° C. In other embodiments, the reactor may have a reactor outlet temperature of from 550° C. to 570° C.

The reactor vessel used for the reactions may be insulated or non-insulated and may be carried out at substantially adiabatic conditions wherein no significant heat input is provided to the reactor other than provided from ambient conditions and by the introduction of the reactants into the reactor at the specified inlet temperature. The endothermic nature of the reaction allows the temperature in the reactor to drop to the selected reactor outlet temperatures specified above. Operation of the reactor at adiabatic conditions using the method of the invention, however, eliminates the need to supply heat to the reactor while at the same time reducing or eliminating methane and coke production. Such reaction conditions have been shown lead to a significant (3-10 times) reduction in methane formation, as well as the formation coke fragments, as compared to the same reaction conducted isothermally at mild temperature conditions (e.g. 560° C.).

The reacting of the gaseous feed mixture containing carbon dioxide and hydrogen with a non-zinc redox catalyst in accordance with the invention may be performed over a wide pressure range. A higher pressure tends to enable lower reaction temperatures, but very high pressures are not practical; therefore, the reaction is generally performed at a pressure ranging from 0.1 to 6.0 MPa. In other embodiments, the pressure may range from 1.5 to 5.0 MPa. In other embodiments, the pressure may range from 2.0 to 4.0 MPa.

The residence time within the reactor or contact time of the gaseous feed mixture containing carbon dioxide and hydrogen with the catalyst according to the processes of the invention may vary widely, but is generally from 0.5 to 6 seconds. In certain embodiments, the residence or contact time may range from 1.5 to 5 seconds. In certain embodiments, the residence or contact time may range from 2 to 4 seconds.

The amount of hydrogen in the feed gas, that is the value for n in the reaction of Equation 2, may vary widely, for example from n=1 to n=5, to result in a syngas feed gas composition. This variance may be expressed as its $H_2/CO$ molar ratio or alternatively as the stoichiometric number (SN), wherein SN=(%$H_2$—%CO)/(%$CO_2$+%CO). The $H_2/CO$ molar ratio and SN can vary within wide limits. The advantage thereof is that the syngas composition may be adjusted and controlled to match desired end-use requirements.

Although the SN may vary outside these ranges, in some embodiments, the SN of the produced syngas mixture may range from 0.1 to 3.0. In other embodiments, the SN may range from 0.5 to 2.8. In other embodiments, the SN may range from 0.9 to 2.7. In some embodiments, SN ranges from 2 to 3. Such syngas product streams may be further employed as feedstocks in different syngas conversion processes, such as methanol formation, olefin synthesis, reduction of iron oxide in steel production, oxosynthesis, (hydro)carbonylation reactions, etc.

In certain embodiments, the feed gas contains equimolar amounts of $CO_2$ and $H_2$. In other embodiments, the feed gas contains $CO_2$ and $H_2$ in molar ratio of 1:2 (n=2 in Equation 2), resulting in a syngas composition with a SN of about 1, which may be advantageously used for producing oxygenates. In yet other embodiments, the feed gas may contain $CO_2$ and $H_2$ in a molar ratio of 1:3 (n=3 in above Equation 2), resulting in a syngas composition with a SN of about 2; which can be advantageously used in olefin or methanol synthesis processes.

The carbon dioxide in the gaseous feed mixture used in the processes of the invention may originate from various sources. In certain embodiments, the carbon dioxide may be provided from a waste gas stream, e.g. from a plant on the same site, for example from ammonia synthesis, optionally with (non-catalytic) adjustment of the gas composition, or after recovering the carbon dioxide from a gas stream. Recycling such carbon dioxide as a starting material in the processes of the invention thus contributes to reducing the amount of carbon dioxide emitted to the atmosphere (from a chemical production site). The carbon dioxide used as feed may also at least partly have been removed from the effluent gas of the RWGS reaction itself and recycled back to the reactor in the feed mixture.

In certain embodiments, other gases may be included in the gaseous feed mixture. These may include inert gases such as nitrogen gas ($N_2$), helium (He), and water.

In preferred embodiments, the water formed in the reaction is generally removed from the product stream driving the equilibrium of the reaction in the desired direction, because water often interferes with subsequent reactions utilizing the syngas. Water can be removed from the product stream with any suitable method known in the art, e.g. condensation, liquid/gas separation, etc.

An advantage of the processes of this invention is that the product stream of the carbon dioxide hydrogenation reaction may be combined and even integrated with other streams. For example, the syngas mixture product stream may be combined with a product from the steam reforming of an alkane, such as methane, or dry reforming of an alkane, such as methane, (also called $CO_2$ reforming) for converting the feed stream into methanol or other chemical The invention may further include the use of the syngas mixture obtained with the processes according to the invention as feed material for a process of making a chemical product. Such processes may include methanol production, olefin synthesis (e.g. via Fischer-Tropsch catalysis), aromatics production, oxosynthesis, carbonylation of methanol, carbonylation of olefins, or the reduction of iron oxide in steel production.

In certain embodiments, the syngas produced may be used in making oxo alcohols via hydroformylation of olefins with syngas, comprising the steps of methane reforming and carbon dioxide hydrogenation according to the invention, to result in a syngas mixture of suitable stoichiometry. By integrating methane (steam) reforming and RWGS steps, the excess hydrogen available in the reformate is advantageously utilized to optimize the amount of carbon monoxide formed. In some embodiments, the amount of CO formed in the RWGS step can also be controlled by the reaction temperature. In certain embodiments, the syngas made according to the invention has a composition characterized by a SN of about 1.

In other embodiments, the invention concerns processes of making methanol from methane via synthesis gas. This is accomplished where carbon dioxide is hydrogenated according to the invention, to result in a syngas mixture of suitable stoichiometry. In certain embodiments the SN is about 2. In such situations, allowing the temperature within the reactor to decrease to about 550° C. to 570° C. provides a final RWGS equilibrium wherein the syngas reaction mixture products has a SN of from 2 to 2.9 that is suitable for use in methanol production. This may allow the syngas product mixture, after water separation, to be used directly in such methanol production. For the step of making methanol from syngas in this process, any suitable synthesis process as known in the art can be applied. In other embodiments, purge gas from the methanol synthesis reaction, containing hydrogen and carbon dioxide is recycled back to the carbon dioxide hydrogenation step.

The following examples serve to further illustrate the invention.

EXAMPLES

Example 1

Comparative

A CATOFIN® $Cr/Al_2O_3$ catalyst (13 wt. % Cr on a gamma oxide of alumina) was tested in an isothermal RWGS reaction at 567° C. using a quartz reactor having a catalyst loading of 7.5 ml. The feed mixture was $CO_2$ at 9 cc/min, $H_2$ at 36 cc/min and $N_2$ at 5 cc/min. The nitrogen gas was used for calculation purposes. The conversion and activity data for catalyst in the quartz reactor is presented in Table 1 below. The balance in the products was nitrogen.

TABLE 1

| Time (days) | Products (mole %) | | | | $CO_2$ Conversion (mole %) |
|---|---|---|---|---|---|
| | $CO_2$ | CO | $H_2$ | $CH_4$ | |
| 10 | 9.4 | 13.6 | 65.2 | - | 59.0 |
| 20 | 9.4 | 13.4 | 65.6 | - | 58.9 |
| 40 | 9.4 | 13.6 | 65.4 | - | 59.1 |
| 64 | 9.3 | 13.6 | 65.7 | - | 59.3 |

The data in Table 1 indicates that in the quartz reactor there was not observable methane formation. The catalyst was stable for 64 days and further screening did not lead to formation of methane. After stopping the reaction there was observable formation of coke in the catalyst bed.

Example 2

Comparative

A CATOFIN® $Cr/Al_2O_3$ catalyst (13 wt. % Cr on a gamma oxide of alumina) was tested for an isothermal RWGS reaction activity at 567° C. similarly to Example 1 but using a non-coated stainless steel reactor (i.e. containing iron and nickel) at a catalyst loading of 7.2 ml. The feed mixture was $CO_2$ at 9.6 cc/min and $H_2$ at 38.4 cc/min. In this case the feed of $CO_2$ and $H_2$ was not diluted with nitrogen, which was observed to be inert during the reaction. The conversion and activity data for the catalyst in stainless steel reactor is presented in Table 2 below.

TABLE 2

| Time (days) | Products (mole %) | | | | $CO_2$ Conversion (mole %) |
|---|---|---|---|---|---|
| | $CO_2$ | CO | $H_2$ | $CH_4$ | |
| 10 | 9.0 | 13.6 | 77.3 | 0.012 | 59.3 |
| 20 | 9.1 | 13.2 | 77.6 | 0.021 | 59.2 |
| 40 | 9.0 | 13.1 | 77.8 | 0.092 | 59.1 |
| 50 | 9.3 | 13.0 | 77.5 | 0.17 | 58.8 |

Table 2 shows that there was gradual accumulation of methane in the products. Analysis of the catalyst after the reaction was stopped showed formation of coke fragments in the form of fine powder. Coke fragments were not accumulated on the catalyst surface and were easily separated from the catalyst. The color of the catalyst was not changed. After 40 days there was approximately 0.5 g of coke formed on the wall of the reactor.

Example 3

Comparative

A CATOFIN® $Cr/Al_2O_3$ catalyst (13 wt. % Cr on a gamma oxide of alumina) was tested in a non-coated stainless steel reactor (i.e. containing iron and nickel) at a catalyst loading of 7.2 ml. The feed mixture was identical to that of Example 2 with $CO_2$ at 9.6 cc/min and $H_2$ at 38.4 cc/min. The reaction was maintained at isothermal conditions at a reaction temperature of 730° C. The conversion and activity data for the $Cr/Al_2O_3$ catalyst in the stainless steel reactor is presented in Table 3 below.

TABLE 3

| Time (days) | Products (mole %) | | | | $CO_2$ Conversion (mole %) |
|---|---|---|---|---|---|
| | $CO_2$ | CO | $H_2$ | $CH_4$ | |
| 10 | 6.6 | 16.6 | 76.7 | 0.004 | 71.3 |
| 15 | 6.6 | 16.5 | 76.8 | 0.004 | 71.5 |
| 20 | 6.6 | 16.5 | 76.8 | 0.003 | 71.3 |
| 30 | 6.7 | 16.6 | 76.7 | 0.004 | 71.1 |

As can be seen the amount of methane produced at high temperature was significantly lower, with no gradual increase of its amount, as contrasted with Example 2.

Example 4

Comparative

A CATOFIN® $Cr/Al_2O_3$ catalyst (13 wt. % Cr on a gamma oxide of alumina) was tested in stainless steel reactor coated with a silica-coating at process conditions identical to those described in Example 3, i.e. catalyst loading of 7.2 ml, $CO_2$ at 9.6 cc/min and $H_2$ at 38.4 cc/min, isothermal at 730° C. The conversion and activity data for the $Cr/Al_2O_3$ catalyst in the coated stainless steel reactor are tabulated in Table 4.

TABLE 4

| Time (days) | T, ° C. | Products (mole %) | | | | $CO_2$ Conversion (mole %) |
|---|---|---|---|---|---|---|
| | | $CO_2$ | CO | $H_2$ | $CH_4$ | |
| 5 | 560 | 9 | 13.5 | 77.4 | 0.009 | 60.0 |
| 10 | 560 | 9.1 | 12.9 | 77.9 | 0.016 | 58.7 |
| 20 | 560 | 8.8 | 13.3 | 77.8 | 0.021 | 59.9 |
| 30 | 730 | 5.58 | 16.5 | 77.9 | 0.009 | 74.7 |
| 35 | 730 | 5.58 | 16.3 | 78.1 | 0.009 | 74.6 |

Example 5

Comparative

Instead of a $Cr/Al_2O_3$ catalyst, a Cu—Mn/$Al_2O_3$ (5% Cu, 10% Mn) was used in silica-coated stainless steel reactor at isothermal conditions (730° C.) at conditions identical to those described for Example 4. The conversion and activity data are presented in Table 5 below.

TABLE 5

| Time (days) | Products (mole %) | | | | | $CO_2$ Conversion (mole %) |
|---|---|---|---|---|---|---|
| | T, ° C. | $CO_2$ | CO | $H_2$ | $CH_4$ | |
| 1 | 560 | 9.1 | 12.8 | 79.3 | 0.034 | 58.4 |
| 2 | 560 | 9.0 | 12.8 | 79.4 | 0.026 | 58.8 |
| 3 | 560 | 9.0 | 12.0 | 79.5 | 0.026 | 58.0 |
| 4 | 560 | 9.3 | 12.2 | 79.0 | 0.029 | 58.7 |
| 5 | 560 | 9.2 | 11.9 | 78.6 | 0.028 | 58.6 |
| 6 | 560 | 9.2 | 12.9 | 79.8 | 0.035 | 58.7 |
| 7 | 560 | 9.2 | 13.0 | 80.6 | 0.036 | 58.7 |
| 8 | 560 | 9.1 | 13.1 | 80.6 | 0.036 | 58.7 |
| 9 | 730 | 6.4 | 16.3 | 74.5 | 0.017 | 71.7 |
| 10 | 730 | 6.4 | 16.5 | 74.4 | 0.013 | 72.1 |
| 11 | 730 | 6.3 | 16.4 | 74.6 | 0.012 | 72.3 |
| 12 | 730 | 6.2 | 16.3 | 74.4 | 0.011 | 72.3 |
| 13 | 730 | 5.8 | 16.1 | 74.2 | 0.011 | 73.3 |

Example 6

A CATOFIN® $Cr/Al_2O_3$ catalyst (13 wt. % Cr on a gamma oxide of alumina) was tested in an uncoated 316L stainless steel reactor (I.D 1.5 inch) using at catalyst loading of 464 ml. The gaseous feed mixture was composed of $CO_2$ at 618.7 cc/min and $H_2$ at 2474.7 cc/min. The reactor inlet temperature was about 730° C. No heat input was made to maintain the reactor at isothermal conditions so that the reactor had a temperature drop to an outlet temperature of about 560° C. The GHSV was 400 $h^{-1}$. The conversion and activity data are presented in Table 6 below. As can be seen, there was no or very little methane formation during the reaction.

TABLE 6

| Time (days) | Products (mole %) | | | | $CO_2$ Conversion (mole %) |
|---|---|---|---|---|---|
| | $CO_2$ | CO | $H_2$ | $CH_4$ | |
| 1 | 8.9 | 13.8 | 73.3 | 0 | 60.6 |
| 2 | 9.1 | 14.0 | 74.5 | 0 | 60.6 |
| 3 | 9.0 | 13.9 | 73.8 | 0.001 | 60.6 |
| 4 | 9.0 | 13.9 | 74.0 | 0.001 | 60.5 |
| 5 | 9.0 | 13.9 | 73.6 | 0.001 | 60.6 |
| 6 | 8.9 | 13.9 | 73.4 | 0.001 | 60.5 |

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:
1. A method for making a syngas mixture comprising:
   introducing a gaseous feed mixture containing carbon dioxide and hydrogen into a reactor containing a non-zinc catalyst that contacts the gaseous feed mixture to form syngas mixture reaction products, the reaction taking place in the presence of nickel-containing and/or iron-containing reactor components, the gaseous feed mixture being introduced into the reactor at a reactor inlet temperature of from 700° C. to 800° C., with the reaction being carried out at substantially adiabatic con- ditions, and wherein at least a portion of said reactor components are non-coated so that nickel-containing and/or iron-containing materials of the reactor components are exposed to said reaction.

2. The method of claim 1, wherein:
the catalyst is an oxide of at least one of chromium (Cr) and copper-manganese (Cu—Mn).

3. The method of claim 1, wherein:
the reactor has a reactor outlet temperature of from 500° C. to 600° C.

4. The method of claim 1, wherein:
the reactor has a reactor outlet temperature of from 550° C. to 570° C.

5. The method of claim 1, wherein:
the reactor inlet temperature is from 720° C. to 780° C.

6. The method of claim 1, wherein:
the reaction products include carbon monoxide.

7. The method of claim 5, wherein:
the carbon monoxide is present in the reaction products in an amount of from 10% to 20% by weight calculated after water removal from the reaction products.

8. The method of claim 1, wherein:
the reaction is carried out at a pressure of from 0.1 MPa and 6 MPa and a reactor residence time of from 0.5 sec to 10 sec.

9. The method of claim 1, wherein:
the reactor components are stainless steel.

10. The method of claim 1, wherein:
the feed gas mixture contains hydrogen and carbon dioxide in a molar ratio of from 1 to 5.

11. The method of claim 1, wherein:
the reaction products include carbon monoxide and hydrogen in a molar ratio of from 0.1 to 3.

12. A method for making a syngas mixture comprising:
introducing a gaseous feed mixture containing carbon dioxide and hydrogen into a reactor containing a non-zinc catalyst that contacts the gaseous feed mixture in the presence of reactor components of nickel-containing and/or iron-containing materials to form syngas mixture reaction products that include carbon monoxide, the gaseous feed mixture being introduced into the reactor at a reactor inlet temperature of from 700° C. to 800° C. wherein the syngas mixture reaction products are removed from the reactor at a reactor outlet temperature of from 500° C. to 600° C., and wherein the reactor components are non-coated so that the nickel-containing and/or iron-containing materials are exposed to said gaseous feed mixture.

13. The method of claim 12, wherein:
the reactor inlet temperature is from 720° C. to 780° C.

14. The method of claim 12, wherein:
the reactor has a reactor outlet temperature of from 550° C. to 570° C.

15. The method of claim 12, wherein:
the catalyst is an oxide of at least one of chromium (Cr) and copper-manganese (Cu—Mn).

16. The method of claim 12, wherein:
the carbon monoxide is present in the reaction products in an amount of from 10% to 20% by weight calculated after water removal from the reaction products.

17. The method of claim 12, wherein:
the reaction is carried out at a pressure of from 0.1 MPa and 6 MPa and a reactor residence time of from 0.5 sec to 10 sec.

18. The method of claim 12, wherein:
the reactor components are stainless steel.

19. The method of claim 12, wherein:
the feed gas mixture contains hydrogen and carbon dioxide in a molar ratio of from 1 to 5.

20. The method of claim 12, wherein:
the reaction products include carbon monoxide and hydrogen in a molar ratio of from 0.1 to 3.

\* \* \* \* \*